UNITED STATES PATENT OFFICE.

MAURICE GASTON OLIVIER, OF PARIS, FRANCE, ASSIGNOR TO SOCIÉTÉ FRANCAISE DE LA VISCOSE, OF PARIS, FRANCE.

PRODUCT OBTAINED FROM CELLULOSE AND THE PROCESS FOR ITS MANUFACTURE.

No. 826,351.     Specification of Letters Patent.     Patented July 17, 1906.

Application filed January 18, 1906. Serial No. 296,655.

*To all whom it may concern:*

Be it known that I, MAURICE GASTON OLIVIER, engineer, a citizen of the French Republic, residing at Paris, Department of the Seine, France, (whose post-office address is 15 Rue Auber, in the said city,) have invented certain new and useful Improvements in Products Obtained from Cellulose and in the Processes for Their Manufacture, of which the following is a specification.

This invention has for its object a new industrial product and a process for its manufacture. The product is obtained from cellulose.

Hitherto all attempts to obtain such cellulose products have been made with viscose; but the results have been unsatisfactory, it being difficult to obtain a homogeneous mixture as regards quality and structure, owing to the unequal fixation of the cellulose and for other reasons to be explained below. These products invariably contained holes or cavities throughout the mass, varied in density and resistance, and were subject to deformations rendering the raw material of little practical value.

According to the old methods the xanthate was dissolved in water, say, to a ten-per-cent. so-called "viscose" and allowed to form under the influence of heat a loose coagulum subject to enormous shrinkage on drying. The product was brittle, incapable of being molded, destructive to tools, &c. To avoid these defects and inconveniences and in order to obtain a material easily molded and turned in the lathe, assuming a fine polish, presenting no cavities or other structural defects, and subject to relatively slight deformation by shrinkage on drying, it is necessary to operate as follows:

The alkali-cellulose is treated in the usual way by carbon bisulfid. The xanthate thus obtained is allowed to mature for a day or two at the ordinary temperature. It is then, without any addition of water, ground for about half an hour in the cold between cylinders until the granular mass has become perfectly smooth and continuous. It is then removed from the cylinders and allowed to stand for about twenty-four hours. The xanthate thus obtained, which is still soluble, not coagulated, is then passed through a helicoidal sausage-machine, in which it is compressed to a perfectly homogeneous mass. This compressed mass on issuing from the machine is received into suitable tubes or molds, in which the cellulose is fixed or regenerated, still under pressure, in an ordinary drying-room at 30° for a period of from twenty-four to thirty-six hours. It is then thoroughly washed in water and dried in a stove. The material thus obtained possessing absolute homogeneity, uniform density, without holes or other blemishes can then be molded and yields a perfect finished product.

The process permits of the cellulose being dyed in various colors and of the incorporation of inert matter, so as to produce agglomerates of any desired aspect and composition.

I now desire to point out in greater detail the essential differences between the old process and the methods which characterize the invention.

According to the old methods the cellulose xanthate was dissolved, say, to a ten-per-cent. viscose and this solution allowed to coagulate in molds under the influence of heat. This loose coagulum after washing was hung up to dry and yielded after enormous shrinkage a brittle mass with many cavities very difficult to turn and of little commercial value.

According to the new method the xanthate is at once ground to a smooth and continuous mass or paste, subjected to pressure in a sausage or other suitable machine producing pressure, and made to coagulate in suitable molds still under pressure. By the combined effect of the grinding, the compressing, and the coagulating under pressure the cavities due to air and carbon bisulfid bubbles are got rid of and a substance obtained which is perfectly homogeneous, highly resistant, possessing great toughness, and capable of being easily turned and molded.

Having thus described and ascertained the nature of my invention and in what manner the same may be performed, I declare that what I claim is—

1. A process of obtaining a product formed of cellulose consisting in grinding the xanthate in a soluble and non-coagulated condition to a smooth and plastic mass without the addition of water, subjecting this product to compression, disposing the material thus further treated in suitable holding devices or molds in which the xanthate is decomposed and the cellulose regenerated, washing the decomposed xanthate and regenerated cellulose with water, drying the same after washing, and finally molding the dried product.

2. A process of obtaining a product formed of cellulose consisting in grinding the xanthate in a soluble and non-coagulated condition without the addition of water to produce a smooth and continuous mass of paste, subjecting this mass to pressure, and further grinding and coagulating the same in suitable molds under pressure.

3. A process of obtaining a product formed of cellulose consisting in grinding, then compressing and coagulating xanthate under pressure, washing the mass thus obtained, and drying the same.

4. A process of obtaining a product formed of cellulose consisting in grinding the xanthate, then compressing and coagulating the xanthate under pressure without the addition of water, the xanthate being primarily in a soluble and non-coagulated condition, washing and drying the mass, and finally molding the substance thus obtained.

5. An improved industrial cellulose product consisting of a soluble and non-coagulated xanthate ground, and then compressed and coagulated under pressure.

6. The process of treating xanthate of cellulose, which consists in grinding the xanthate in a soluble and non-coagulated condition to a homogeneous, plastic mass, and subsequently decomposing the mass to regenerate the cellulose.

7. The process of treating xanthate of cellulose, which consists in grinding the xanthate in a soluble and coagulated condition to a homogeneous, plastic mass, compressing the mass, and subsequently decomposing the mass to regenerate the cellulose.

In testimony whereof I have hereunto set my hand in presence of two subscribing witnesses.

MAURICE GASTON OLIVIER.

Witnesses:
EMILE KLOTZ,
PIERRE LEISSE.